US012080110B2

(12) United States Patent
Ogawa et al.

(10) Patent No.: US 12,080,110 B2
(45) Date of Patent: Sep. 3, 2024

(54) PRIME MOVER ROTATION SPEED DISPLAY DEVICE

(71) Applicant: HONDA MOTOR CO., LTD., Tokyo (JP)

(72) Inventors: Seiichi Ogawa, Tokyo (JP); Ukyo Ogata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/418,921

(22) Filed: Jan. 22, 2024

(65) Prior Publication Data

US 2024/0249566 A1 Jul. 25, 2024

(30) Foreign Application Priority Data

Jan. 23, 2023 (JP) ................................ 2023-008037

(51) Int. Cl.
*G07C 5/02* (2006.01)

(52) U.S. Cl.
CPC ...................................... *G07C 5/02* (2013.01)

(58) Field of Classification Search
CPC .......... G07C 5/02; B60K 35/00; B60K 35/20; B60W 50/14; B60W 2050/146; B60W 30/19
See application file for complete search history.

(56) References Cited

U.S. PATENT DOCUMENTS

| | | | | |
|---|---|---|---|---|
| 10,053,003 | B2 * | 8/2018 | Teratani | G01P 1/08 |
| 2017/0268961 | A1 * | 9/2017 | Teratani | B60W 30/19 |
| 2018/0032650 | A1 * | 2/2018 | Chang | G06F 30/20 |
| 2018/0209870 | A1 * | 7/2018 | Yamamoto | G01M 15/046 |
| 2018/0297465 | A1 * | 10/2018 | Miyaishi | F16H 61/36 |

FOREIGN PATENT DOCUMENTS

| | | |
|---|---|---|
| JP | 5005586 B2 | 8/2012 |

* cited by examiner

*Primary Examiner* — Lori Wu
(74) *Attorney, Agent, or Firm* — Paratus Law Group, PLLC

(57) ABSTRACT

A prime mover rotation speed display device includes: a prime mover rotation speed acquisition unit configured to acquire a rotation speed; a shift target rotation speed calculation unit configured to calculate a shift target rotation speed; a shift instruction rotation speed calculation unit configured to calculate a shift instruction rotation speed; and a meter display control unit configured to calculate a meter display rotation speed provided for meter display, wherein the meter display control unit calculates the meter display rotation speed based on at least the rotation speed of the prime mover, calculates the meter display rotation speed based on at least the shift instruction rotation speed, performs upper limit control and lower limit control of setting the meter display rotation speed to the shift target rotation speed if the meter display rotation speed is expected to be higher or to be lower than the shift target rotation speed.

4 Claims, 4 Drawing Sheets

PRIME MOVER ROTATION SPEED DISPLAY DEVICE

CROSS-REFERENCE TO RELATED APPLICATIONS

This application is based on and claims priority under 35 USC 119 from Japanese Patent Application No. 2023-008037 filed on Jan. 23, 2023, the entire content of which is incorporated herein by reference.

TECHNICAL FIELD

The present invention relates to a prime mover rotation speed display device, and more particularly to a prime mover rotation speed display device mounted on a vehicle including an automatic transmission.

BACKGROUND ART

In the related art, the driver's seat of a vehicle is provided with a tachometer for displaying the rotation speed of the engine, which enables the driver to recognize the engine rotation speed. The engine rotation speed display device usually controls the display of the engine rotation speed to be displayed on the tachometer in accordance with an actual engine rotation speed signal output from an engine rotation speed sensor.

In this type of engine rotation speed display device, the behavior of the engine rotation speed displayed on the tachometer is delayed with respect to the actual rotation behavior due to a delay in calculation processing on the engine rotation speed based on an input signal from the engine rotation speed sensor or the like, the responsiveness when displaying the calculated engine rotation speed, or the like. Such a delay in behavior is not particularly problematic during normal traveling, but for example, during a shift with a large change in the rotation speed, it is difficult for the engine rotation speed on the display to sufficiently follow the change in the acceleration/deceleration feeling, the engine sound, or the like felt by the driver or the like, which may cause a discomfort feeling. Regarding this, Japanese Patent No. 5005586 describes changing the method for calculating the rotation speed for a meter according to the phase at the time of shifting of an automatic transmission.

The continuously variable transmission is known as an automatic transmission. A continuously variable transmission is capable of smooth shifting, but is incapable of quick shifting or fixing the transmission ratio as the staged transmission does. However, in recent years, shift control that simulates staged shift on a continuously variable transmission has been developed.

SUMMARY OF INVENTION

In such an automatic transmission, the engine rotation speed display device is desired to cause the feeling of a quick shift response or the feeling as if the transmission ratio were fixed.

The present invention provides a prime mover rotation speed display device capable of expressing a quick shift response and a feeling of a fixed transmission ratio.

The present invention is a prime mover rotation speed display device for being mounted on a vehicle including an automatic transmission in a power transmission system from a prime mover to a drive wheel, the prime mover rotation speed display device including:

a prime mover rotation speed acquisition unit configured to acquire a rotation speed of the prime mover;

a shift target rotation speed calculation unit configured to calculate a shift target rotation speed of the prime mover based on at least one piece of information among a speed of the vehicle, a state of the automatic transmission, a rotation speed of the prime mover, or an opening degree of an accelerator pedal;

a shift instruction rotation speed calculation unit configured to calculate a shift instruction rotation speed of the prime mover based on the shift target rotation speed of the prime mover; and a meter display control unit configured to calculate a meter display rotation speed provided for meter display, in which the meter display control unit calculates the meter display rotation speed based on at least the rotation speed of the prime mover when the automatic transmission operates in a predetermined state, calculates the meter display rotation speed based on at least the shift instruction rotation speed when the automatic transmission operates in another predetermined state, performs upper limit control of setting the meter display rotation speed to the shift target rotation speed if the meter display rotation speed based on the shift instruction rotation speed is expected to be higher than the shift target rotation speed when the rotation speed of the prime mover is lower than the shift target rotation speed, and performs lower limit control of setting the meter display rotation speed to the shift target rotation speed if the meter display rotation speed based on the shift instruction rotation speed is expected to be lower than the shift target rotation speed when the rotation speed of the prime mover is higher than the shift target rotation speed.

According to the present invention, it is possible to express a quick shift response and a feeling of a fixed transmission ratio.

DESCRIPTION OF EMBODIMENTS

Hereinafter, an engine rotation speed display device as a prime mover rotation speed display device according to an embodiment of the present invention and an example of a vehicle equipped with the engine rotation speed display device will be described with reference to the accompanying drawings.

Figure 1:
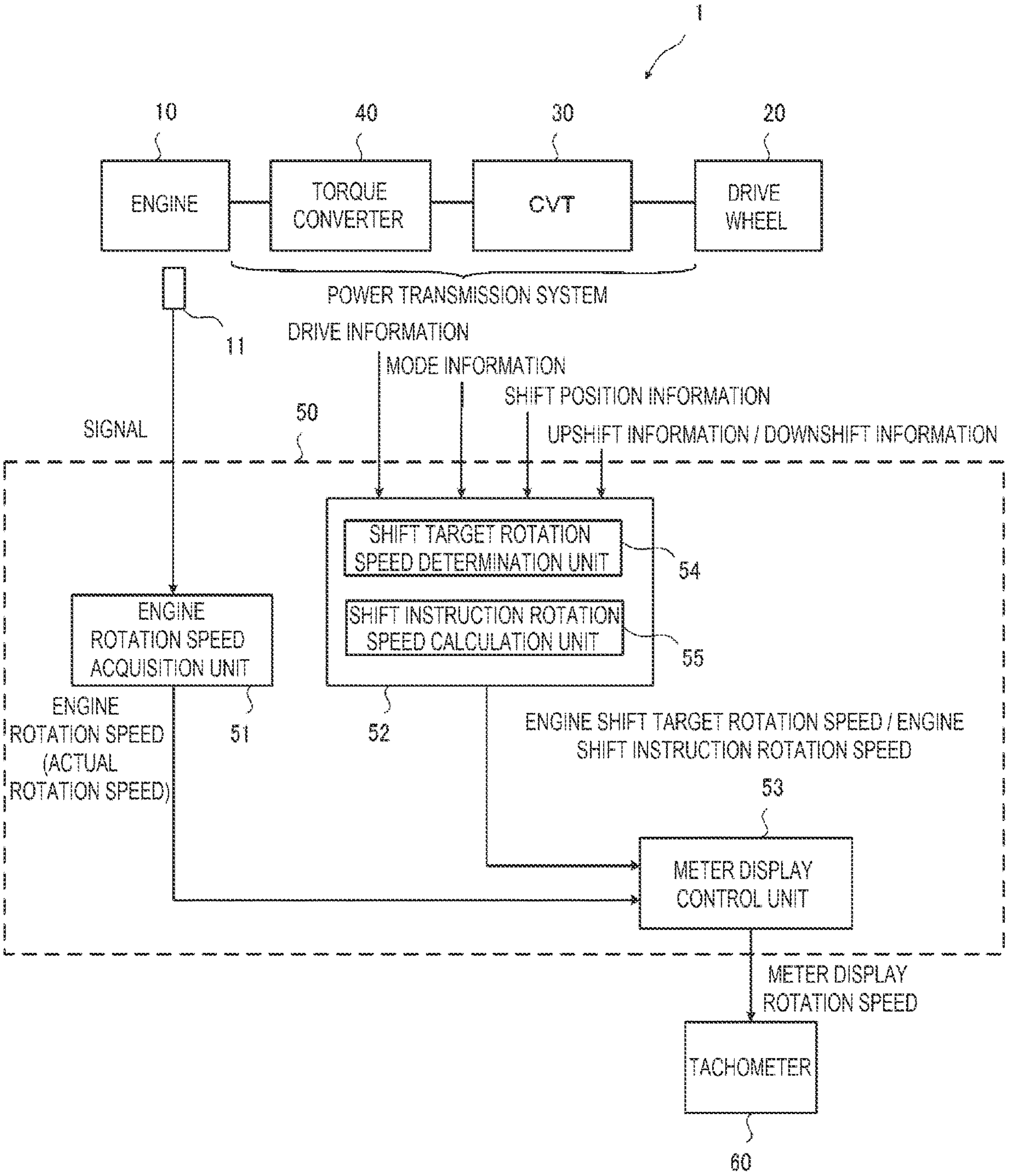
FIG. 1 is a block diagram of a vehicle 1 including an engine rotation speed display device 50 according to an embodiment of the present invention.

FIG. 1 is a block diagram of a vehicle 1 including an engine rotation speed display device 50.

The vehicle 1 includes an engine 10, a torque converter 40, a CVT 30, and a drive wheel 20 as main constituent elements. In other words, the vehicle 1 includes the torque converter 40 and the CVT 30 in the power transmission system from the engine 10 to the drive wheel 20.

The engine 10 is an example of a prime mover, and is a drive source of the vehicle 1. The engine 10 is provided with an engine rotation speed sensor 11 for detecting a rotation speed. The engine rotation speed sensor 11 is, for example, a crank angle sensor, and outputs a signal to an engine rotation speed acquisition unit 51 described later.

The torque converter 40 amplifies the torque by the rotation difference (slip) between the input side and the output side. The CVT 30 is an example of automatic transmission (AT), and is a power transmission mechanism for continuously changing the transmission ratio. The CVT 30 may be a belt-type continuously variable transmission which shifts gears continuously by combining a belt and two variable-diameter pulleys (a drive pulley and a driven pulley), a toroidal continuously variable transmission which shifts gears continuously by combining a plurality of power rollers and two disks (an input disk and an output disk), or another continuously variable transmission.

The CVT 30 realizes a normal state, a paddle upshift state, a paddle downshift state, a kickdown state, a post-kickdown acceleration state, an upshift state, a post-upshift acceleration state, and the like in accordance with the driving conditions.

The normal state is a state without sudden operation on the accelerator pedal or operation on the paddle during the traveling of the vehicle. The paddle upshift state and the paddle downshift state are states of shifting gears in accordance with an operation on the paddle disposed in the vicinity of the steering wheel of the driver. The kickdown state is a state of downshifting when the accelerator pedal is depressed at a predetermined opening degree or more and at a predetermined speed or more. The post-kickdown acceleration state is a state of continuously depressing the accelerator pedal after the kickdown state to raise the rotation speed at a constant gradient.

The upshift state is a state of upshifting to reach traveling upper limit rotation speed by depressing the accelerator pedal to fully open. The post-upshift acceleration state is a state of raising the rotation at a constant gradient when the accelerator pedal is continuously depressed after the upshift state. The paddle upshift state, the paddle downshift state, the kickdown state, and the upshift state are shift control for having fixed shift stages, in other words, shift control simulating a staged shift with a continuously variable transmission. Such a shift is to produce a quick response. On the other hand, in the post-kickdown acceleration state and the post-upshift acceleration state, the actual rotation speed (engine rotation speed) of the engine 10 is likely to change (fluctuate). Therefore, such a shift is to provide a feeling of a fixed transmission ratio.

The vehicle 1 includes an engine rotation speed display device 50 and a tachometer 60 for displaying a meter display rotation speed output from the engine rotation speed display device 50. The tachometer 60 is disposed, for example, on the instrument panel of the dashboard of the driver's seat together with other instruments. The tachometer 60 may be a pointer tachometer or a digital tachometer.

The engine rotation speed display device 50 includes: an engine rotation speed acquisition unit 51 for receiving a signal from the engine rotation speed sensor 11 to acquire the engine rotation speed, which is the actual rotation speed of the engine 10; a drive control unit 52 for controlling the engine 10 and the CVT 30; and a meter display control unit 53 for calculating the meter display rotation speed provided for the meter display.

The engine rotation speed acquisition unit 51 receives a signal from the engine rotation speed sensor 11 to calculate the engine rotation speed (actual rotation speed).

The drive control unit 52 includes: a shift target rotation speed calculation unit 54 for calculating the shift target rotation speed of the engine 10; and a shift instruction rotation speed calculation unit 55 for calculating the shift instruction rotation speed of the engine 10. In addition to the drive information of the power transmission system, the drive control unit 52 receives the input of mode information, shift position information, upshift information, and downshift information. The mode information is set by, for example, the driver operating a button, and includes a normal mode, a sport mode, an eco mode, a comfort mode, a snow mode, and the like. The shift position information is the position of the shift lever, and includes D range, S range, L range, and the like. The upshift information is an upshift request signal by an operation on the paddle, and the downshift information is a downshift request signal by an operation on the paddle.

The shift target rotation speed calculation unit 54 calculates the shift target rotation speed of the engine 10 based on at least one piece of information among the speed of the vehicle, the state of the CVT 30, the engine rotation speed, and the opening degree of the accelerator pedal. The shift target rotation speed may be calculated from the at least one piece of information or may be acquired from a map associated with the at least one piece of information.

Figure 2:
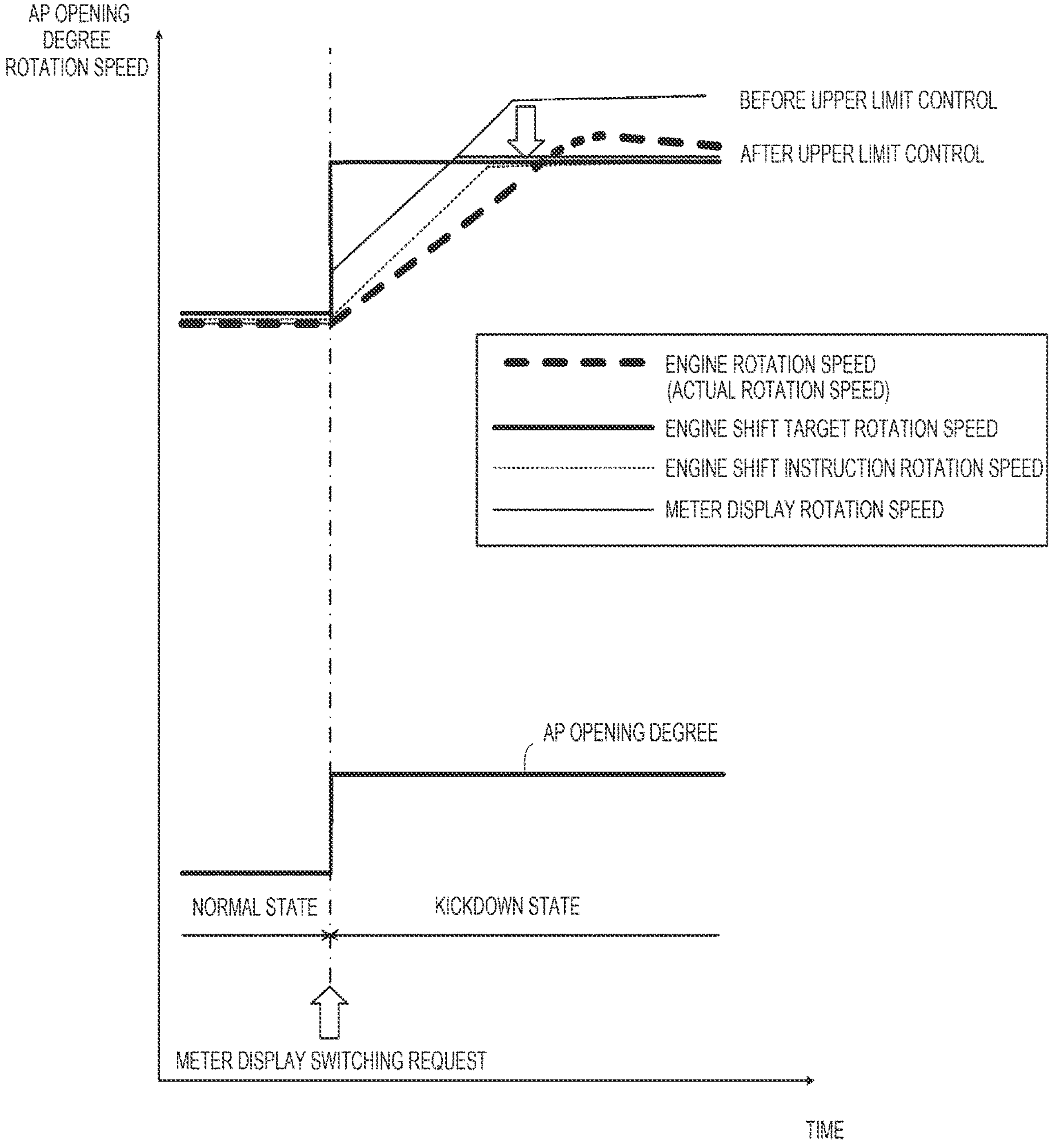
FIG. 2 is a timing chart when a CVT 30 transitions from a normal state to a kickdown state.
Figure 3:
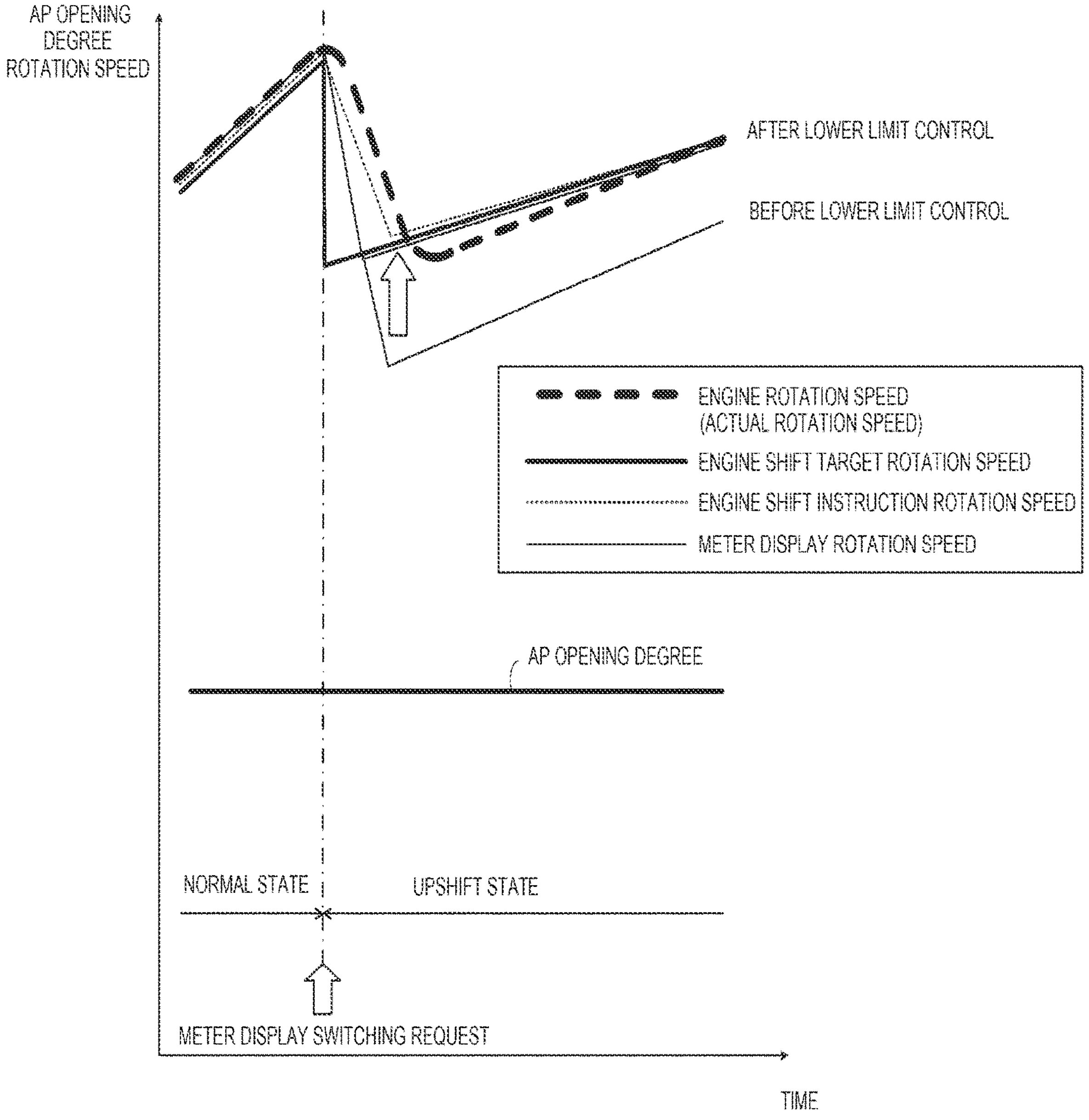
FIG. 3 is a timing chart when the CVT 30 transitions from the normal state to an upshift state.

The shift instruction rotation speed calculation unit 55 calculates the shift instruction rotation speed based on the shift target rotation speed of the engine 10. The shift instruction rotation speed is calculated by, for example, increasing or decreasing the previous shift instruction rotation speed by a rotational change amount calculated based on the shift target rotation speed. The engine 10 is controlled such that the engine rotation speed follows the shift instruction rotation speed. Therefore, as illustrated in FIGS. 2 and 3, the shift instruction rotation speed is located between the engine rotation speed and the shift target rotation speed in the initial stage of the shift operation.

When the CVT 30 is in the normal state, the meter display control unit 53 calculates the meter display rotation speed based on the engine rotation speed (actual rotation speed). When the CVT 30 is in the normal state, the meter display control unit 53 transmits the engine rotation speed as the meter display rotation speed to the tachometer 60, for example.

On the other hand, when the CVT 30 is not in the normal state, that is, when the CVT 30 is in the paddle upshift state, the paddle downshift state, the kickdown state, the post-kickdown acceleration state, the upshift state, the post-upshift acceleration state, or the like, the meter display control unit 53 calculates the meter display rotation speed based on the shift instruction rotation speed received from the shift instruction rotation speed calculation unit 55. More preferably, the meter display control unit 53 calculates the meter display rotation speed based on the shift instruction rotation speed, the shift coefficient, the mode coefficient, and the torque converter coefficient.

For example, the meter display control unit 53 calculates the meter display rotation speed based on the following Equation (1).

Meter display rotation speed=shift instruction rotation speed×shift coefficient×mode coefficient/torque converter coefficient (1)

The shift coefficient is a coefficient set in advance in accordance with the shift state (paddle upshift state, paddle downshift state, kickdown state, post-kickdown acceleration state, upshift state, post-upshift acceleration state).

The mode coefficient is a coefficient set in advance according to the mode information and the shift position information. For example, the mode coefficient is set to A1 in the D range of the normal mode, A2 in the S range of the normal mode, A3 in the L range of the normal mode, B1 in the D range of the sport mode, B2 in the S range of the sport mode, and B3 in the L range of the sport mode.

The torque converter coefficient is a coefficient set in advance according to the slip ratio of the torque converter 40.

FIG. 2 is a timing chart when the CVT 30 transitions from the normal state to the kickdown state.

The CVT 30 transitions from the normal state to the kickdown state when the accelerator pedal is depressed at a predetermined opening degree or more and at a predetermined speed or more. In the kickdown state, the shift target rotation speed increases, and the shift instruction rotation speed gradually increases accordingly. Since the engine 10 is controlled such that the engine rotation speed becomes equal to the shift instruction rotation speed, the engine rotation speed follows the shift instruction rotation speed with a delay. At this time, the meter display control unit 53 receives the input of the meter display switching request. The meter display control unit 53 sets the meter display rotation speed to the value calculated by Equation (1) based on the shift instruction rotation speed from the previous state in which the meter display rotation speed is set to the engine rotation speed. As described above, in the kickdown state, the meter display rotation speed is set to the value calculated based on the shift instruction rotation speed, so that a quick shift response can be produced apparently.

The shift process proceeds to a timing at which the meter display rotation speed based on the shift instruction rotation speed calculated by Equation (1) becomes higher than the shift target rotation speed. When the meter display rotation speed based on the shift instruction rotation speed becomes higher than the shift target rotation speed, the deviation from the engine rotation speed becomes too large. Therefore, if the meter display rotation speed based on the shift instruction rotation speed is expected to be higher than the shift target rotation speed, the meter display control unit 53 executes the upper limit control of setting the meter display rotation speed to the shift target rotation speed. This can prevent the meter display rotation speed from greatly deviating from the engine rotation speed. Further, the fluctuation of the engine rotation speed can be prevented from being displayed as it is in the later half stage of the shift, which can produce a feeling of a fixed transmission ratio.

FIG. 3 is a timing chart when the CVT 30 transitions from the normal state to the upshift state.

The CVT 30 transitions from the normal state to the upshift state when the accelerator pedal is depressed at a predetermined opening degree or more (for example, fully open) to reach the traveling upper limit rotation speed. In the upshift state, the shift target rotation speed decreases, and the shift instruction rotation speed gradually decreases accordingly. Since the engine 10 is controlled such that the engine rotation speed becomes equal to the shift instruction rotation speed, the engine rotation speed follows the shift instruction rotation speed with a delay. At this time, the meter display control unit 53 receives the input of the meter display switching request. The meter display control unit 53 sets the meter display rotation speed to the value calculated by Equation (1) based on the shift instruction rotation speed from the previous state in which the meter display rotation speed is set to the engine rotation speed. As described above, in the upshift state as well, the meter display rotation speed is set to the value calculated based on the shift instruction rotation speed, so that a quick shift response can be produced apparently.

The shift process proceeds to a timing at which the meter display rotation speed based on the shift instruction rotation speed calculated by Equation (1) becomes lower than the shift target rotation speed. When the meter display rotation speed based on the shift instruction rotation speed becomes lower than the shift target rotation speed, the deviation from the engine rotation speed becomes too large. Therefore, if the meter display rotation speed based on the shift instruction rotation speed is expected to be lower than the shift target rotation speed, the meter display control unit 53 executes the lower limit control of setting the shift target rotation speed to the meter display rotation speed. This can prevent the meter display rotation speed from greatly deviating from the engine rotation speed. Further, the fluctuation of the engine rotation speed can be prevented from being displayed as it is in the later half stage of the shift, which can produce a feeling of a fixed transmission ratio.

Figure 4:
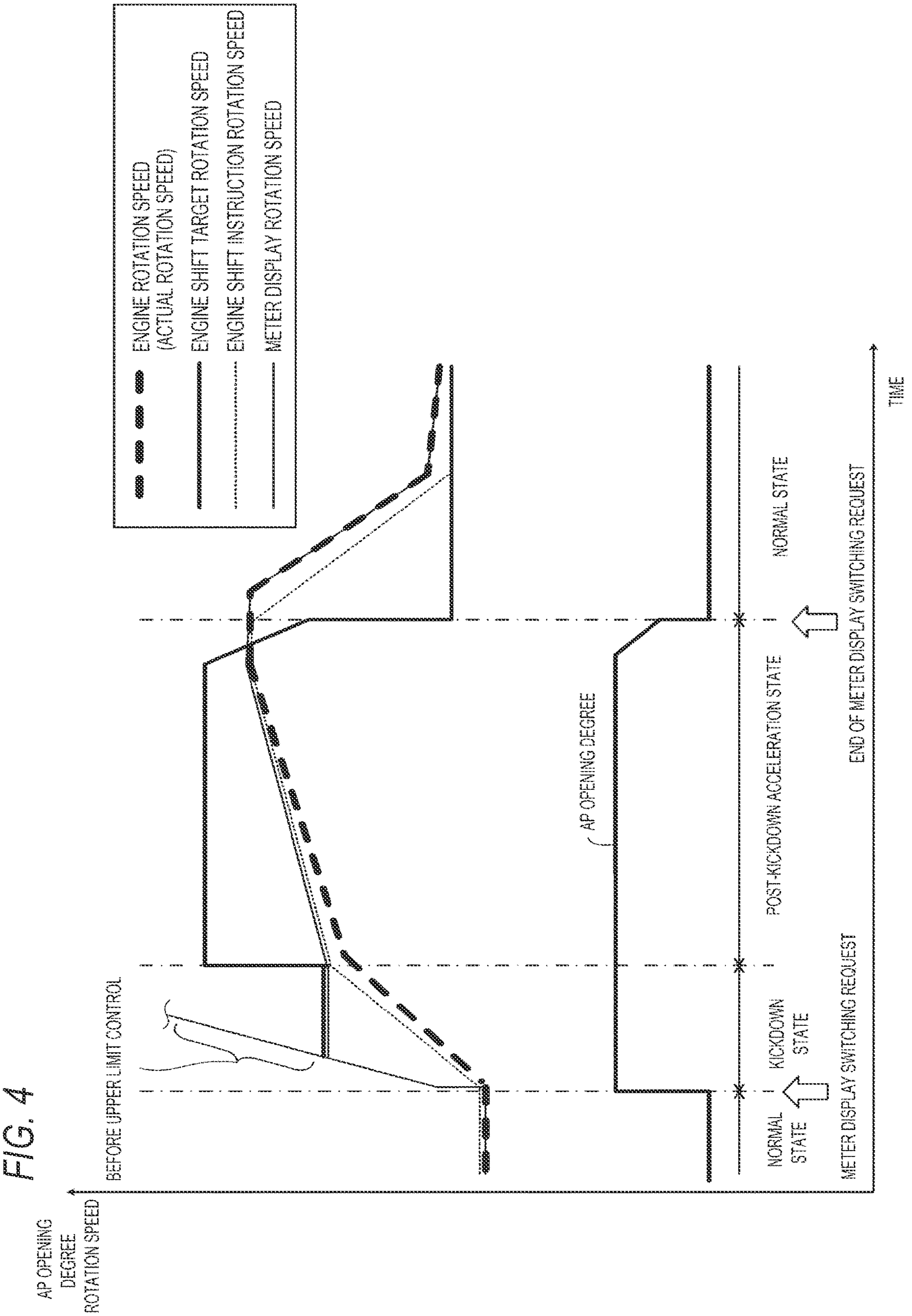
FIG. 4 is a timing chart when the CVT 30 transits from the normal state to the kickdown state and a post-kickdown acceleration state, then returns to the normal state.

FIG. 4 is a timing chart when the CVT 30 transits from the normal state to the kickdown state and the post-kickdown acceleration state, then returns to the normal state.

The meter display in the normal state and the meter display in the kickdown state are as described with reference to FIG. 2. When the accelerator pedal is continuously depressed after the kickdown state, the CVT 30 is brought into a post-kickdown acceleration state in which the rotation speed is increased at a constant gradient. In this state, similarly to the kickdown state, the meter display rotation speed is set to the value calculated by Equation (1) based on the shift instruction rotation speed. On the other hand, unlike the kickdown state, the upper limit control of setting the meter display rotation speed to the shift target rotation speed is not executed even if the meter display rotation speed based on the shift instruction rotation speed is expected to be higher than the shift target rotation speed.

That is, as illustrated in FIG. 4, when the accelerator pedal opening degree is slightly reduced in the post-kickdown acceleration state, the shift target rotation speed is reduced accordingly and becomes smaller than the meter display rotation speed based on the shift instruction rotation speed. If the upper limit control is executed at this time, although the engine rotation speed does not decrease so much, the meter display rotation speed decreases due to the decrease in the shift target rotation speed, which causes the driver to have a discomfort feeling. Therefore, by performing the upper limit control in the kickdown state and not performing the upper limit control in the post-kickdown acceleration state, it is possible to prevent a failure that the engine rotation speed does not decrease but the meter display rotation speed decreases when the accelerator opening degree is decreased.

When the CVT 30 returns to the normal state due to the accelerator being turned off in the post-kickdown acceleration state, the meter display switching request is ended, and the meter display control unit 53 sets the meter display rotation speed to the engine rotation speed.

Although not illustrated, the lower limit control is performed in the upshift state, and the lower limit control is not performed in the post-upshift acceleration state. Accordingly, it is possible to prevent a failure that the meter display rotation speed decreases in a state where the engine rotation speed does not decrease when the accelerator opening degree is decreased.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiments may be freely combined without departing from the gist of the invention.

In the present specification, at least the following matters are described. Corresponding constituent elements and the like in the embodiment described above are shown in parentheses, but the present invention is not limited thereto.

(1) A prime mover rotation speed display device (engine rotation speed display device 50) for being mounted on a vehicle (vehicle 1) including an automatic transmission (CVT 30) in a power transmission system from a prime mover (engine 10) to a drive wheel (drive wheel 20), the prime mover rotation speed display device including:

- a prime mover rotation speed acquisition unit (engine rotation speed acquisition unit 51) configured to acquire a rotation speed of the prime mover (engine rotation speed);
- a shift target rotation speed calculation unit (shift target rotation speed calculation unit 54) configured to calculate a shift target rotation speed of the prime mover based on at least one piece of information among a speed of the vehicle, a state of the automatic transmission, a rotation speed of the prime mover, or an opening degree of an accelerator pedal;
- a shift instruction rotation speed calculation unit (shift instruction rotation speed calculation unit 55) configured to calculate a shift instruction rotation speed of the prime mover based on the shift target rotation speed of the prime mover; and
- a meter display control unit (meter display control unit 53) configured to calculate a meter display rotation speed provided for meter display, in which
- the meter display control unit
- calculates the meter display rotation speed based on at least the rotation speed of the prime mover when the automatic transmission operates in a predetermined state (normal state),
- calculates the meter display rotation speed based on at least the shift instruction rotation speed when the automatic transmission operates in another predetermined state (kickdown state, upshift state, or the like),
- performs upper limit control of setting the meter display rotation speed to the shift target rotation speed if the meter display rotation speed based on the shift instruction rotation speed is expected to be higher than the shift target rotation speed when the rotation speed of the prime mover is lower than the shift target rotation speed, and
- performs lower limit control of setting the meter display rotation speed to the shift target rotation speed if the meter display rotation speed based on the shift instruction rotation speed is expected to be lower than the shift target rotation speed when the rotation speed of the prime mover is higher than the shift target rotation speed.

According to (1), in the other predetermined state, the meter displays a meter display rotation speed different from the rotation speed of the prime mover, thereby producing a quick shift response. Further, the upper limit control and the lower limit control can prevent the meter display rotation speed from greatly deviating from the rotation speed of the prime mover. Further, the fluctuation of the rotation speed of the prime mover can be prevented from being displayed as it is in the later half stage of the shift, which can produce a feeling of a fixed transmission ratio.

(2) The prime mover rotation speed display device according to (1), in which

- said another predetermined state includes
- a kickdown state in which a downshift is performed when the accelerator pedal has a predetermined opening degree or more and the vehicle has a predetermined speed or more, and
- a post-kickdown acceleration state in which the accelerator pedal maintains a predetermined opening degree or more after the kickdown state,
- the upper limit control is performed in the kickdown state, and
- the upper limit control is not performed in the post-kickdown acceleration state.

According to (2), in the kickdown state, the meter display rotation speed is prevented from greatly deviating from the rotation speed of the prime mover. Meanwhile, by not performing the upper limit control in the post-kickdown acceleration state, it is possible to prevent a failure that the rotation speed of the prime mover does not decrease but the meter display rotation speed decreases when the accelerator opening degree is decreased.

(3) The prime mover rotation speed display device according to (1), in which

- said another predetermined state includes
- an upshift state in which an upshift is performed when the accelerator pedal has a predetermined opening degree or more and the rotation speed of the prime mover reaches a predetermined rotation speed or more, and
- a post-upshift acceleration state in which the accelerator pedal is maintained at a predetermined opening degree or more after the upshift state,
- the lower limit control is performed in the upshift state, and
- the lower limit control is not performed in the post-upshift acceleration state.

According to (3), in the upshift state, the meter display rotation speed is prevented from greatly deviating from the rotation speed of the prime mover. Meanwhile, by not performing the lower limit control in the post-upshift acceleration state, it is possible to prevent a failure that the rotation speed of the prime mover is not lowered but the meter display rotation speed decreases when the accelerator is off.

(4) The prime mover rotation speed display device according to any one of (1) to (3), in which

- the automatic transmission is a continuously variable transmission, and
- said another predetermined state includes a state controlled to have a plurality of virtual fixed shift stages.

According to (4), it is possible to achieve a simulated staged shift similar to a staged shift even in a continuously variable transmission. Further, a quick shift response and a feeling of fixed transmission ratio can be produced in simulated staged shift control in a continuously variable transmission.

What is claimed is:

1. A prime mover rotation speed display device for being mounted on a vehicle including an automatic transmission in a power transmission system from a prime mover to a drive wheel, the prime mover rotation speed display device comprising:

a prime mover rotation speed acquisition unit configured to acquire a rotation speed of the prime mover;

a shift target rotation speed calculation unit configured to calculate a shift target rotation speed of the prime mover based on at least one piece of information among a speed of the vehicle, a state of the automatic transmission, a rotation speed of the prime mover, or an opening degree of an accelerator pedal;

a shift instruction rotation speed calculation unit configured to calculate a shift instruction rotation speed of the prime mover based on the shift target rotation speed of the prime mover; and a meter display control unit configured to calculate a meter display rotation speed provided for meter display, wherein the meter display control unit calculates the meter display rotation speed based on at least the rotation speed of the prime mover when the automatic transmission operates in a predetermined state, calculates the meter display rotation speed based on at least the shift instruction rotation speed when the automatic transmission operates in another predetermined state, performs upper limit control of setting the meter display rotation speed to the shift target rotation speed if the meter display rotation speed based on the shift instruction rotation speed is expected to be higher than the shift target rotation speed when the rotation speed of the prime mover is lower than the shift target rotation speed, and performs lower limit control of setting the meter display rotation speed to the shift target rotation speed if the meter display rotation speed based on the shift instruction rotation speed is expected to be lower than the shift target rotation speed when the rotation speed of the prime mover is higher than the shift target rotation speed.

2. The prime mover rotation speed display device according to claim 1, wherein said another predetermined state includes a kickdown state in which a downshift is performed when the accelerator pedal has a predetermined opening degree or more and the vehicle has a predetermined speed or more, and a post-kickdown acceleration state in which the accelerator pedal maintains a predetermined opening degree or more after the kickdown state, the upper limit control is performed in the kickdown state, and the upper limit control is not performed in the post-kickdown acceleration state.

3. The prime mover rotation speed display device according to claim 1, wherein said another predetermined state includes an upshift state in which an upshift is performed when the accelerator pedal has a predetermined opening degree or more and the rotation speed of the prime mover reaches a predetermined rotation speed or more, and a post-upshift acceleration state in which the accelerator pedal is maintained at a predetermined opening degree or more after the upshift state, the lower limit control is performed in the upshift state, and the lower limit control is not performed in the post-upshift acceleration state.

4. The prime mover rotation speed display device according to claim 1, wherein the automatic transmission is a continuously variable transmission, and said another predetermined state includes a state controlled to have a plurality of virtual fixed shift stages.

* * * * *